J. BIGELOW
Cut Hose.
No. 9,113. Reissued Mar. 9, 1880
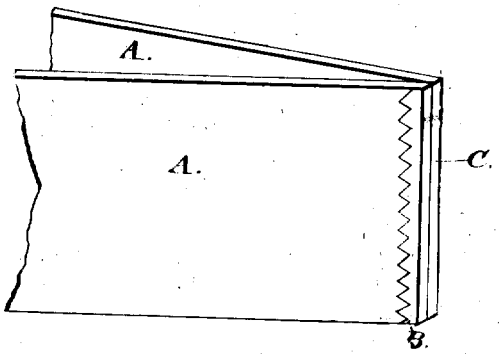
WITNESSES
F. L. Durand
H. A. Fontaine
INVENTOR
John Bigelow
by L. Deane
ATTORNEY

UNITED STATES PATENT OFFICE.

JOHN BIGELOW, OF PHILADELPHIA, PENNSYLVANIA.

CUT HOSE.

~~SPECIFICATION forming part of Reissued Letters Patent No. 9,119, dated March 9, 1880.~~

Original No. 214,354, dated April 15, 1879. Application for reissue filed August 6, 1879.

DIVISION B.

*To all whom it may concern:*

Be it known that I, JOHN BIGELOW, of Philadelphia, in the county of Philadelphia and State of Pennsylvania, have invented certain new and useful Improvements in Cut Hose; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

In my original patent a machine is shown for forming an irregular-stitched seam similar to the one herein specially described; but this forms no part of this specification, as the ~~same constitutes the subject matter of Division~~ A of this reissue.

The object of the present invention is to unite the seams of hose formed from cut knit fabric by a strong, elastic, and flat seam; and it consists more particularly of a hose having its superimposed edges united by a zigzag or an irregular stitch formed within its edges, as will now more in detail be set out and described.

The great desirability of a strong, elastic, and flat seam for hose to be worn on the foot within the shoe or boot is manifest. Heretofore such a seam has usually been produced only on goods having a selvage edge, and, since these are made on high-priced and slow-running machinery, they are expensive and necessarily beyond the means of the ordinary buyer.

Usually seams on cut knit goods before the present invention have been sewed by a straight stitch as produced by the Grover & Baker or the Willcox & Gibbs machines, and this was made, necessarily, so far within the edges to prevent pulling out that the finished goods always have a considerable edge—say of a quarter of an inch wide—outside the seam. This, in its roughness and bulkiness, is always a source of physical discomfort and complaint to the wearer, while the straight stitch has but a limited elasticity and is not a strong one.

In the accompanying drawing my invention is generally illustrated, A A being pieces of the cut knit fabric, the one being placed upon or superimposed on the other. B is the line of irregular or zigzag stitches made within the edges of the pieces A A, and C is the completed seam, formed by trimming off the surplus of the fabric close to but outside of the line of stitching B.

The zigzag or irregular stitch allows the trimming to be done without injury or decrease of the strength of the seam, since the inner portion of the stitch holds the fabric together, and the outer portion ties and binds the loose ends of the cut knit fabric in such a manner as to firmly secure them, and thus make a hold for said inner portion. Finally, the knit goods A A, thus sewed and trimmed, are boarded, and the seam is pressed quite flat, which is easily accomplished by reason ~~of the peculiar character of the stitch and of~~ the removal of the surplus fabric, as above described. When completed the seam is a close equivalent of a selvage hand-sewed seam.

I am aware that heretofore, as in the patent to H. A. Blanchard, No. 167,492, the edges of fabrics have been sewed by a stitch passing alternately within and without the edge, and lay no claim to the invention described and claimed in said patent.

Having thus described my invention, what I consider new, and desire to secure by Letters Patent, is—

1. As a new article of manufacture, a cut hose having its parts united by a seam formed of a series of zigzag or irregular stitches, the outer edge of said seam being within and in close proximity to the edge of the fabric, substantially as set forth.

2. As a new article of manufacture, a cut hose having its parts united by a series of stitches formed within its superimposed edges, one part of said stitches serving to unite the fabric together, and another part of the same serving to tie and bind the cut threads of the fabric, substantially as described.

In testimony that I claim the foregoing I have hereunto set my hand this 7th day of June, 1879.

JOHN BIGELOW.

Witnesses:
L. DEANE,
A. J. SCHULTEIS.